United States Patent [19]

Suzuki

[11] Patent Number: 4,499,503
[45] Date of Patent: Feb. 12, 1985

[54] VIDEO FORMAT SIGNAL RECORDING AND REPRODUCTION SYSTEM

[75] Inventor: Tsutomu Suzuki, Saitama, Japan

[73] Assignee: Pioneer Electronic Corporation, Tokyo, Japan

[21] Appl. No.: 358,733

[22] Filed: Mar. 16, 1982

[30] Foreign Application Priority Data

Mar. 17, 1981 [JP] Japan .................................. 56-38497

[51] Int. Cl.³ ............................................ H04N 9/491
[52] U.S. Cl. .................................... 358/316; 358/341; 358/343
[58] Field of Search ................ 358/316, 343, 145, 341

[56] References Cited

U.S. PATENT DOCUMENTS 3,717,721  2/1973  Makara et al. ...................... 358/316
4,233,627  11/1980  Sugihara .............................. 358/145
4,383,279  5/1983  Kenny .................................. 358/341

Primary Examiner—Richard Murray
Attorney, Agent, or Firm—Sughrue, Mion, Zinn, Macpeak, and Seas

[57] ABSTRACT

A video format signal recording and reproduction system includes means for providing audio voice-over or narration during a still video segment. A portion of the video image corresponding to around 20 horizontal lines is used to insert and record the audio data, while a color level generator operates to fill predetermined color in the 20 or so lines on the face of the CRT.

18 Claims, 4 Drawing Figures

VIDEO FORMAT SIGNAL RECORDING AND REPRODUCTION SYSTEM

BACKGROUND OF THE INVENTION

This invention relates to a video format signal recording and reproducing system, and more particularly to a video format signal recording and reproducing system using a recording medium such as a video disk.

A video format signal, being similar in arrangement to an ordinary television signal, includes a series of field signals each having a data signal part bearing video data, etc., horizontal and vertical synchronizing signal parts, and horizontal and vertical blanking parts. In general, two adjacent field signals form a frame signal.

A system is well known in the art, in which such a video format signal, after being subjected to signal processing such as FM modulation, is recorded on a recording medium such as a video disk, and in which the video format signal thus recorded is reproduced at a desired place when required.

In such a recording and reproducing system, a method of inserting audio data in the data signal part through time base compression is employed so that, while a still image is being reproduced, oral explanation may be made.

A typical example of this method will be described with reference to a video disk. In a video disk, each circular recording track is regarded as a period corresponding to one TV frame. Audio data is recorded in the first through (N−1)-th ones of the N frames, while video data is recorded in the N-th frame. These N frames are handled as one group.

In reproducing the video disk, the audio data recorded in the first through (N−1)-th frames is read and is temporarily stored in a memory, and the recording track corresponding to the N-th frame is repeatedly subjected to reproduction to obtain the still image, while the audio data is read out of the memory and reproduced after being subjected to time base expansion to real time.

The frequency band of a video signal, which can be recorded on a video disk, ranges from a DC component to a 4 MHz component. If the frequency band of the audio signal extends up to 15 KHz, then the frequency band of the video signal is about 260 times that of the audio signal. Therefore, for one TV frame period (about 1/30 second), an audio signal of about 8.5 seconds can be recorded after being subjected to time base compression. In reproducing still image data, 15 to 30 seconds are sufficient to explain the image data orally. For the abovedescribed reason, a series of audio data are recorded in two to four TV frames, after being subjected to time base compression, and the still image data is recorded in another TV frame.

In reproducing the video disk in which data have been recorded according to the above-described system, since almost all of the frames are for audio data and only the remaining frames are for the video data, if the frames containing audio data signals are displayed on the cathode ray tube, they appear as noise against the necessary video signals. The appearance of the noise may be eliminated by clamping the image to a color (black, white or gray) at a certain level; however, in this case, the image is erased momentarily, as a result of which the so-called "flickering phenomenon" is caused, which is uncomfortable for the person observing the image.

SUMMARY OF THE INVENTION

Accordingly, an object of this invention is to provide a video format signal recording and reproducing system in which the flickering phenomenon of the reproduced image is eliminated, whereby a person may view the image comfortably.

In a video format signal recording system according to the invention, audio data is inserted and recorded for a predetermined period corresponding to at least one of horizontal lines which occur successively from the start of each field period in the video format signal and/or for a predetermined period corresponding to at least one of horizontal lines which occur successively immediately before each field period is ended.

The video format signal reproducing system according to the invention is designed to reproduce a video format signal which has been recorded according to the aforementioned video format signal recording system. In the reproducing system, according to the invention, the audio data in the audio data inserting and recording period is extracted and is subjected to audio reproduction processing, and during the period a signal corresponding to a predetermined color (for instance "black") level is added to perform video reproduction processing.

DETAILED DESCRIPTION OF THE PREFERRED EMBODIMENTS

Figure 1:
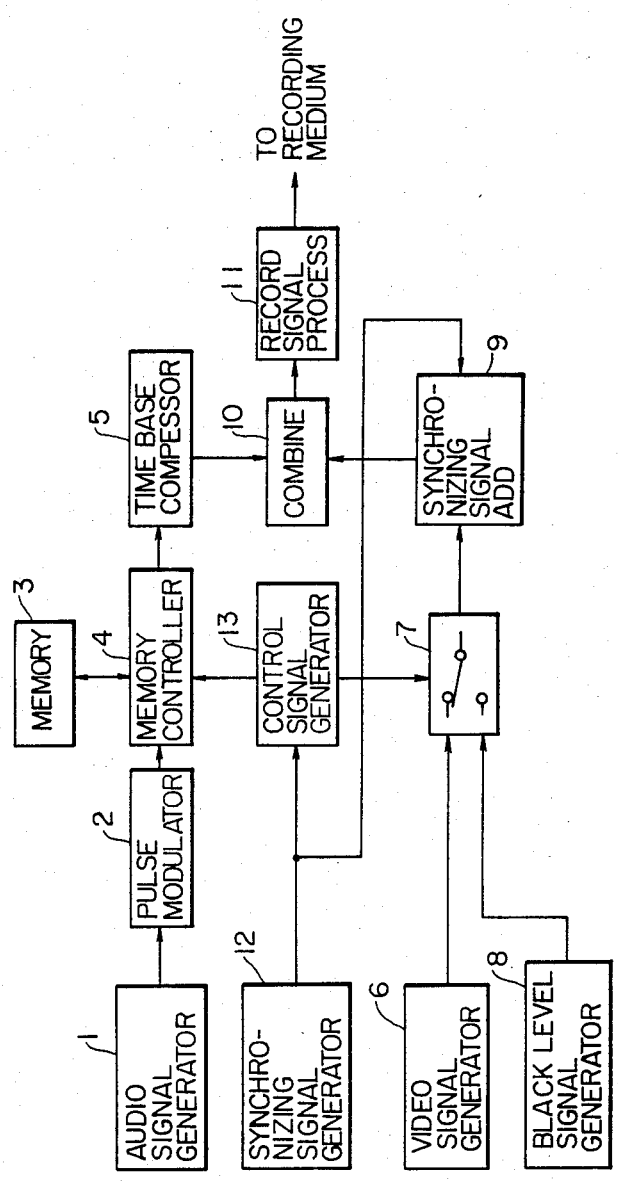
FIG. 1 is a block diagram illustrating one example of a recording device according to this invention.

FIG. 1 shows one example of a recording system according to the invention. An audio signal generator 1 produces an audio signal, which is applied to a pulse modulator 2 so as to be subjected to A/D (analog-to-digital) conversion. The output of the pulse modulator is applied through a memory controller 4, which controls the writing and reading operation of a memory 3, to the latter, where it is stored temporarily. The content thus stored is read out of the memory 3 with predetermined timing under the control of the memory controller 4, and is applied to a time base compressor 5.

A video signal from a video signal generator 6 is applied, as one input, to a video switch 7. A signal corresponding to a "black" level from a "black" level signal generator 8 may be employed as the other input of the video switch 7, for example. Thus, the video signal and the "black" level signal are selectively applied to a synchronizing signal adding unit 9 according to the operation of the video switch 7. The output of the synchronizing signal adding unit 9 and that of the time base compressor 5 are combined (i.e., time division multiplexed) by a signal combining unit 10, the output of which is applied to a record signal processing unit 11 such as an FM modulator. The output of the record signal processing unit 11 is recorded on a recording medium such as a video disk (not shown).

A synchronizing signal generator 12 produces a horizontal synchronizing signal, a vertical synchronizing signal and blanking signal, which are applied to a control signal generator 13 and to the synchronizing signal adding unit 9.

Figure 2:
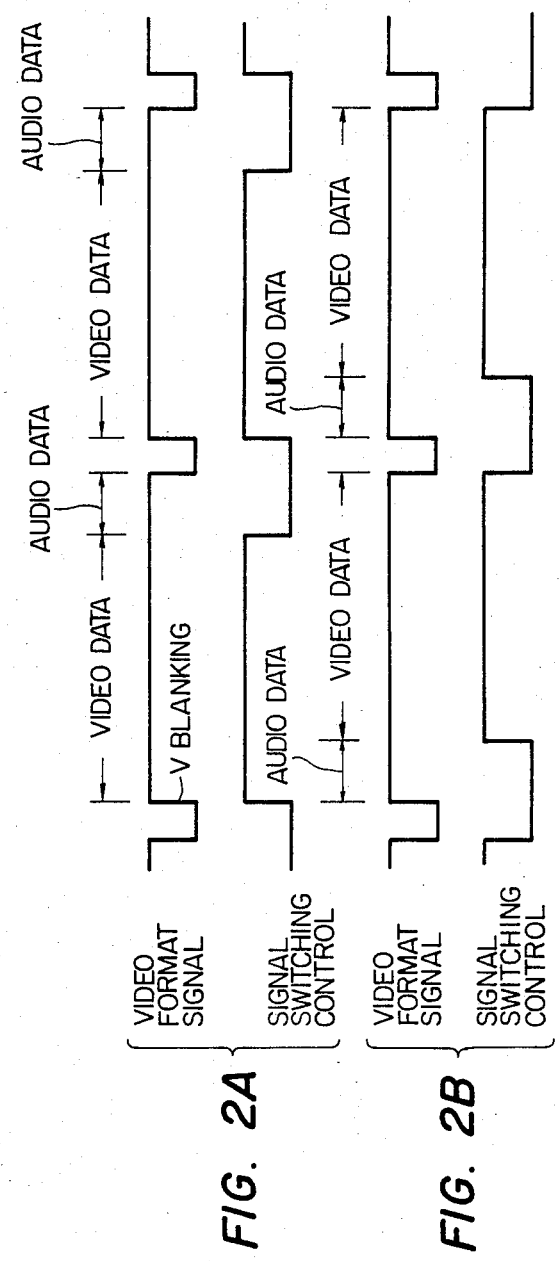
FIGS. 2A and 2B are diagrams for describing examples of a recording system according to the invention.

FIGS. 2A and 2B are timing charts for describing the operation of the recording system shown in FIG. 1, with respect to video format signals of different arrangement. First, the case of the video format signal as shown in FIG. 2A will be described. In the video format signal, audio data is inserted for a part of a period between vertical (V) blanking pulses, namely, a field period, which part corresponds to a predetermined number of horizontal lines which appear successively immediately before the end of the field period; and still image data is inserted for the remaining part corresponding to the remaining horizontal lines.

In this case, for the period corresponding to the last n horizontal lines (n being a whole number) for which audio data is to be inserted, the signal corresponding to the "black" level from the "black" level signal generator 8 is selected by the switch 7; and for the remaining period corresponding to (525/2−n) horizontal lines, the video data signal is selected by the switch 7. The operation of the switch 7 is controlled by the control signal generator 13. For this purpose, a counter circuit for example or the like is used to count horizontal synchronizing signals outputted by the synchronizing signal generator 12, so that the control signal generator 13 produces a switching control signal which is set to a low level when (525/2−n) pulses are counted after the occurrence of a blanking pulse, and the low level signal thus produced is used to cause the video switch 7 to select the output of the "black" level signal generator 8. The counter circuit is reset by the rise of the following blanking pulse. On the other hand, the control signal generator 13 produces a control signal so that the reading of data out of the memory 3 is operated for a period corresponding to n horizontal lines except the horizontal flyback time for which audio data is inserted.

A recording system using a video format signal as shown in FIG. 2B will now be considered. Audio data is inserted for a period corresponding to n horizontal lines immediately after the start of a field period, and video data is delivered, as it is, for the remaining period. The operation of the video switch 7 is controlled by a switching signal indicated in the lower part of FIG. 2B, and the reading of data out of the memory 3 is operated for the audio data inserting period except the horizontal flyback time.

In the above-described example, the audio signal may be subjected to pulse code modulation (PCM), for instance, so that it is converted into a digital signal. However, in the case of a PCM signal, the bit signal frequency is high, i.e., the number of pulses is large. Therefore, if the time allowed for audio data with respect to one piece of still image data is limited as noted above, it is necessary to provide many horizontal lines for audio data insertion, and accordingly the amount of video data is reduced by as much. In order to overcome this difficulty, a delta modulation system may be employed for the pulse modulator 2. That is, if a modulation system is employed in which an audio signal having a band width of 20 KHz is sampled with a sampling pulse of 40 KHz, so that a bit "1" is set when the sampling data is larger than the preceding sampling data, a bit "0" is set when it is smaller, and bits "1" and "0" are repeated when equal, then the number of bits to be transmitted per sampling data can be equal to one.

It is assumed that 333 bit delta modulation pulses are inserted in a horizontal line period, audio data is inserted for a period corresponding to twenty (20) horizontal lines in a field period, and an audio explanation or voice-over of about ten seconds is assigned to each still image. In the case where sampling is carried out with a sampling pulse of 40 KHz, a 10-sec audio signal transmission bit pulse contains $10 \times 40 \times 10^3 = 4 \times 10^5$ bits. Therefore, $4 \times 10^5$ bits/$333 \times 20 \cong 60$ fields is obtained. Accordingly, a still image can be recorded for a period corresponding to sixty (60) fields, i.e., thirty (30) frames, and audio data, which has been subjected to time base compression and pulse modulation, can be recorded for a period corresponding to twenty (20) horizontal lines which appear immediately after a field period starts or immediately before a field period ends.

When a video disk formed according to the above-described recording system is reproduced on a television set, the upper or lower part, corresponding to twenty (20) horizontal lines of the image is lacking on the cathode ray tube. However, if the "black" level is provided for the upper or lower part, then explaining sentences, etc. can be superimposed in the upper or lower part with an opaque projector ("Telop"). Furthermore, the so-called "flickering phenomenon", which is one of the drawbacks of the prior art, can be completely eliminated.

Figure 3:
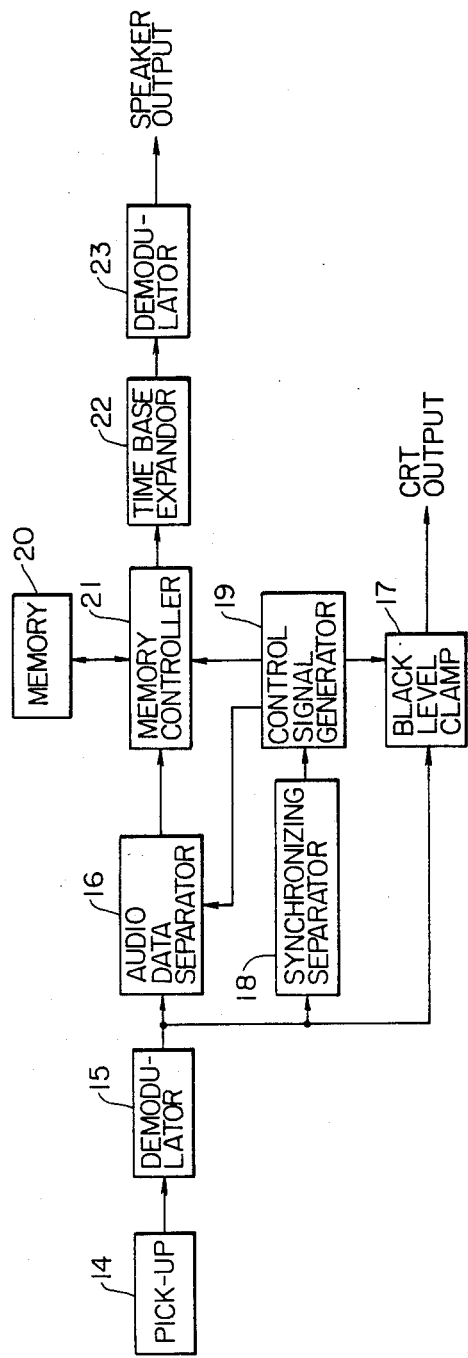
FIG. 3 is a block diagram showing one example of a reproducing device according to the invention.

FIG. 3 is a block diagram outlining one example of a video disk reproducing device which is used to reproduce a video disk in which data have been recorded according to the recording system shown in FIG. 1. A reproducing RF signal from a pick-up unit 14 is demodulated by a demodulator 15, the output of which is applied to an audio data separator 16 and a "black" level clamp circuit 17. The output of the demodulator 15 is further applied to a synchronizing separator 18. Control signals are produced for the audio data separator 16 and the "black" level clamp circuit 17 by utilizing various synchronizing signals and a blanking signal which are separated by the synchronizing separator 16. The output of the "black" level clamp circuit 17 is applied, as a video signal, to a cathode ray tube (CRT) drive circuit (not shown).

The output of the audio data separator 16 is stored in a memory 20, and is read out of the latter 20 when required. The operation of the memory 20 is controlled by a memory controller 21, which is itself controlled by a control signal from the control signal generator 19. The output of the memory is subjected to real time conversion in a time base expandor 22, and is then converted into an analog audio signal in a pulse demodulator 23. The analog audio signal is applied to a loudspeaker drive circuit (not shown).

In the case where data have been recorded on a disk in the format as shown in FIGS. 2A and 2B, the control signal generator 19 outputs control signals so that the "black" level clamp circuit 17 operates to output the "black" level signal for the period corresponding to twenty (20) horizontal lines for which audio data is inserted, and so that the audio data separator 16 operates to separate only the pulse modulation signal in the same period. The audio data in the period is digital data of "0" or "1" level. The levels "0" or "1" of the modulation pulse can be recognized by a level comparator as the audio data separator 16 in comparison with a reference level of the "gray" or "black" levels.

The digital audio data thus separated is temporarily stored in the memory 20. When the data is read out of the memory 20, the data are suitably subjected to real time expansion so as to be in agreement with the real time of the video signal.

In the above-described embodiment, audio data subjected to time base compression is inserted for the predetermined period corresponding to at least one of horizontal lines in either the first or last part of each field period; however, the audio data may be divided into two parts which are inserted in both the first and last parts of each field period, respectively. In the above-described embodiment, the same still image is recorded in thirty (30) frames; however, if images which are slightly different from one another (motion pictures) are recorded in the frames, respectively, then advantageously a so-called "frame-skipping" or "slow motion" reproduction with audio explanation can be carried out. The above-described circuitry is not limitative; that is, it may be variously modified or changed within the ambit of the invention.

As is apparent from the above description, according to the invention, a static image or slow motion image with audio voice-over or the like can be obtained without causing the flickering phenomenon, and therefore a person can comfortably observe the images. Furthermore, additional visual data (i.e., "Telop") can be inserted in the upper and/or lower blank parts of the image on the cathode ray tube screen.

What is claimed is:

1. A video format signal recording system for recording video data and audio data to be reproduced along with said video data, comprising means for inserting and recording said audio data for a predetermined period corresponding to at least one of the horizontal lines which occur during each field period of said video format signal.

2. A recording system as claimed in claim 1, wherein said predetermined time period corresponds to at least one of the horizontal lines which occur successively from the start of each field period of said video format signal.

3. A recording system as claimed in claim 1, wherein said predetermined time period corresponds to at least one of the horizontal lines which occur successively immediately before each field period ends.

4. A recording system as claimed in claim 1, wherein said predetermined time period corresponds to at least one of the horizontal lines which occur successively from the start of each field period of said video format signal and to at least one of the horizontal lines which occurs successively immediately before each field period of said video format signal ends.

5. A recording system as claimed in any one of claims 1, 2, 3, or 4, wherein said audio data is recorded after being subjected to time base compression.

6. A recording system as claimed in any one of claims 1, 2, 3, or 4, wherein said audio data is recorded via a pulse modulation system.

7. A recording system as claimed in any one of claims 1, 2, 3, or 4, said means for inserting and recording audio data comprising audio signal generator means for producing an audio signal, pulse modulation means modulating said audio signal into digital fashion, and memory means for storing the output of said pulse modulation means.

8. A recording system as claimed in claim 7, including memory control means controlling read and write operations of said memory, the content of said memory being controllably output to time base compression means for compressing the time base of said audio signal.

9. A recording system as claimed in claim 8, the output of said time base compression means being combined with a further signal and applied to a recording medium via record signal processing means for transforming said audio data into a recording form.

10. A recording system as claimed in any one of claims 1, 2, 3, or 4, wherein said means for clamping the video signal includes a video signal generator means providing video data as a first output, color level generating means providing a predetermined color level as a second output, control signal generator means, synchronizing signal adding means, video switch means for selectively applying either said first or second output to said synchronizing signal adding means, under the control of said control signal generator means and combining means for combining the output of said adding means with the means for recording the audio data.

11. A recording system as claimed in claim 10, wherein said control signal generating means includes means for operating said switch means to direct said second output to said adding means during said predetermined period.

12. A recording system as claimed in claim 11, wherein said control signal generating means including counter means for counting a predetermined number of horizontal synchronization signals and outputting a control signal to operate said switch upon reaching said predetermined number.

13. A system for reproducing a video format signal in which audio data to be reproduced along with video data is inserted and recorded for a predetermined period corresponding to at least one of the horizontal lines which occur successively within a selected portion of each field period of said video format signal, comprising means for extracting said audio data in said period and subjecting said data to audio reproduction processing, and means for adding, in said period of said video format signal, a signal corresponding to a predetermined color level to perform video reproduction processing.

14. A reproducing system as claimed in claim 13, wherein said audio data is recorded after being subjected to time base compression, and is subjected to said audio reproduction processing after being subjected to time base expansion.

15. A reproducing system as claimed in claims 13 or 14, wherein said audio data is recorded according to a pulse modulation system, and is subjected to said audio reproduction processing after being demodulated.

16. A reproducing system as claimed in claim 13, wherein said means for extracting includes demodulation means and audio data separation means for separating an audio data from said video format signal.

17. A reproducing system as claimed in claim 16, including memory means for receiving and storing an output of said audio data separation means, memory controller means for controlling the output of said memory means, and time base expansion means for expanding the time base of the output of said memory means.

18. A reproducing system as claimed in claim 17, including control signal generating means for controlling said memory control means and said audio data separation means, said means for producing comprising color level clamp means controlled by said control signal generating means, to apply a signal corresponding to said predetermined color level to a drive circuit of video reproducing means, during said predetermined period.

* * * * *